United States Patent [19]

Lowry

[11] 4,177,234

[45] Dec. 4, 1979

[54] METHOD AND APPARATUS FOR CLEANING THERMOPLASTIC MATERIALS

[75] Inventor: George W. Lowry, Ashley, Ind.

[73] Assignee: Metals & Plastics, Inc., Ashley-Hudson, Ind.

[21] Appl. No.: 839,444

[22] Filed: Oct. 5, 1977

[51] Int. Cl.$^2$ .................... B29B 1/03; B29C 29/00; B29F 3/06

[52] U.S. Cl. .................... 264/140; 29/403.4; 210/71; 210/415; 241/23; 264/37; 264/141; 264/142; 264/176 R; 264/40.1; 264/40.7

[58] Field of Search ............ 29/403; 264/37, 176 R, 264/138, 141, 142, 40.1, 40.7; 210/415, 137, 71; 241/23

[56] References Cited

U.S. PATENT DOCUMENTS

| | | | |
|---|---|---|---|
| 989,975 | 4/1911 | Holt | 210/415 |
| 3,093,579 | 6/1963 | Schmidt | 210/415 |
| 3,126,818 | 3/1964 | Koelsch | 210/415 |
| 3,342,638 | 9/1967 | Wanzenberg | 29/403 |
| 3,687,288 | 8/1972 | Lynch et al. | 210/137 |
| 3,695,173 | 10/1972 | Cox | 210/415 |
| 3,861,287 | 1/1975 | Manser | 366/83 |
| 4,077,754 | 3/1978 | Borcher et al. | 366/83 |

*Primary Examiner*—W. E. Hoag
*Attorney, Agent, or Firm*—Fitch, Even & Tabin

[57] ABSTRACT

A method for cleaning thermoplastic material especially for reclaiming thermoplastic material from scrap material which includes in addition to the thermoplastic material, materials having a higher melting point than the thermoplastic, such as metal, thermosetting material, etc. The scrap material which has been treated to remove large particles of metal and/or other hard materials is heated and extruded to thereby provide a confined pressurized stream of melted thermoplastic material containing therein small metallic or other unmelted particles. A portion of the stream of melted material is filtered to provide a filtrate composed of melted thermoplastic material containing therein unmelted materials having a size less than a preselected size. The separated unmelted material remains in the stream and the flow rate of this remainder portion of the stream is controlled or metered so as to maintain the stream under pressure where it is being filtered whereby most of the melted thermoplastic material is caused to flow in the filtrate while the remainder portion carries away the separated unmelted material. The apparatus may be retrofitted on a conventional extruder by adding an extruder screw extension and a cylindrical screening means about the screw extension which will wipe the interior surface of the screen of contanimants. The metering of contaminant bearing stream is preferably by chilling the stream to a semi-solid state and grinding the semi-solid state stream. The preferred screen is formed of a punched plate formed into a cylinder and plated with an abrasion resistant material which covers the sharp edges of the holes with a rounded surface.

11 Claims, 10 Drawing Figures

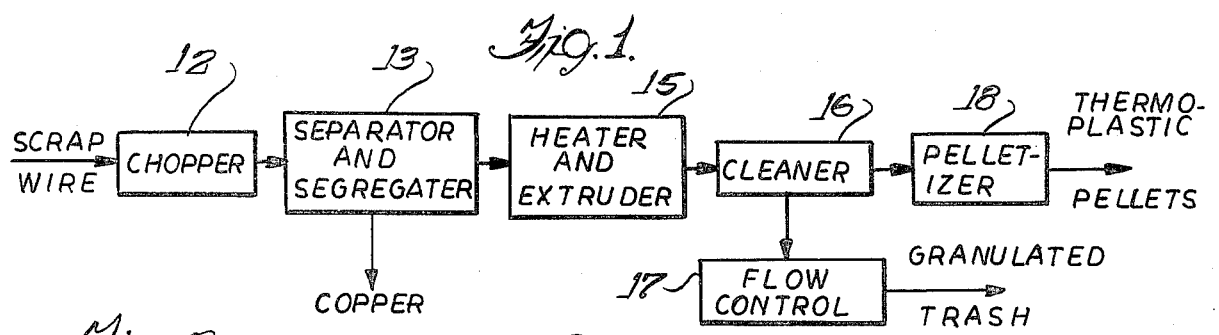
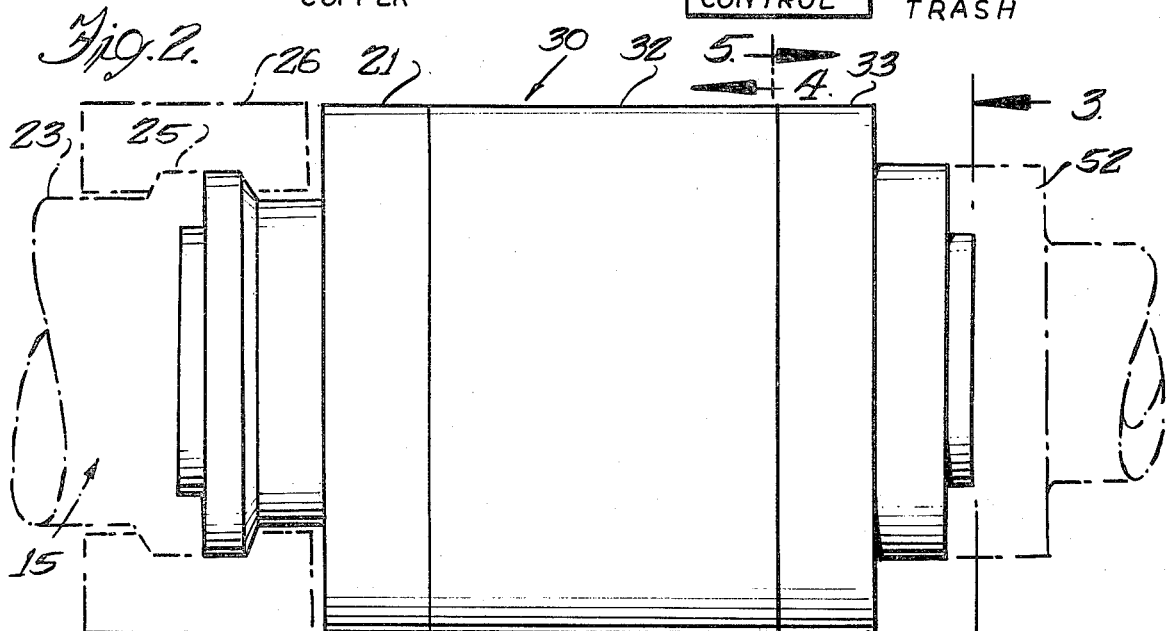
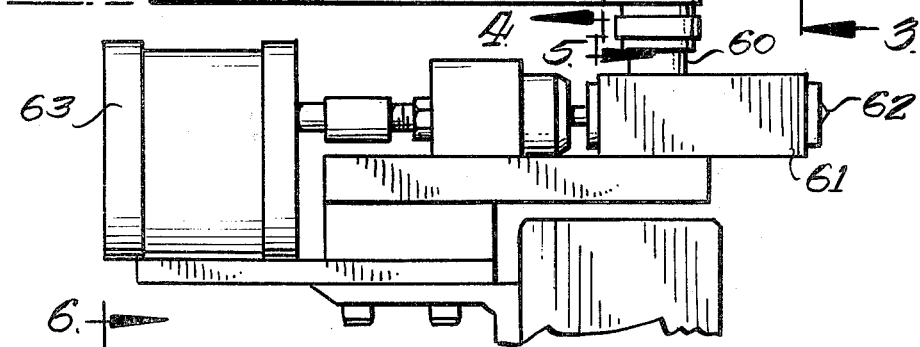
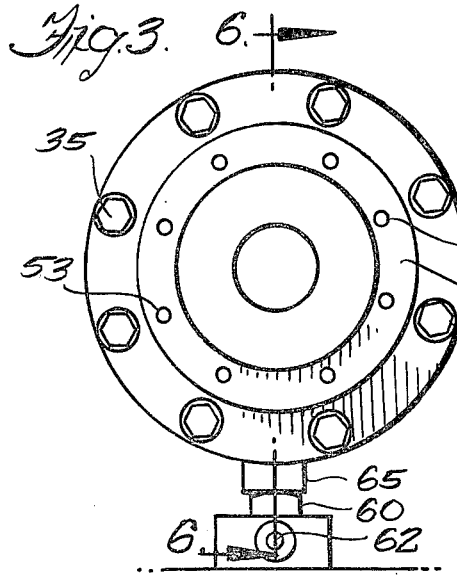
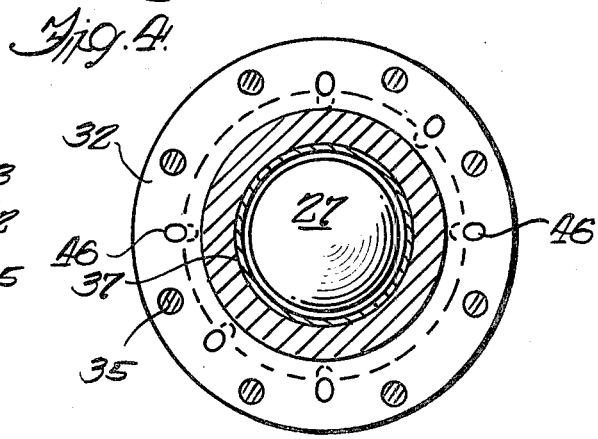

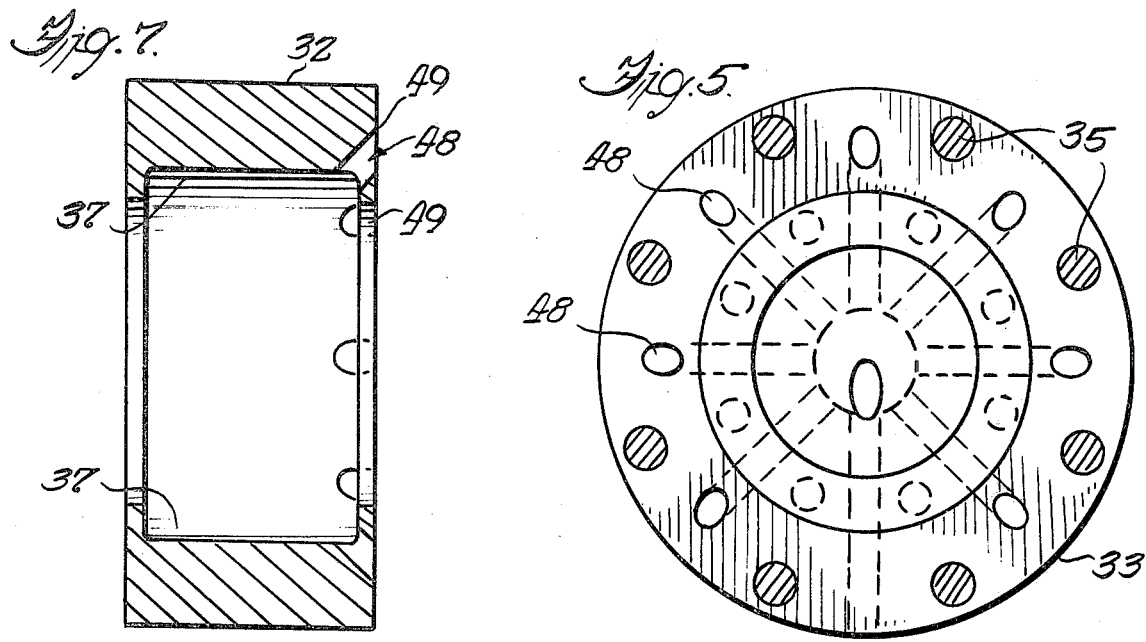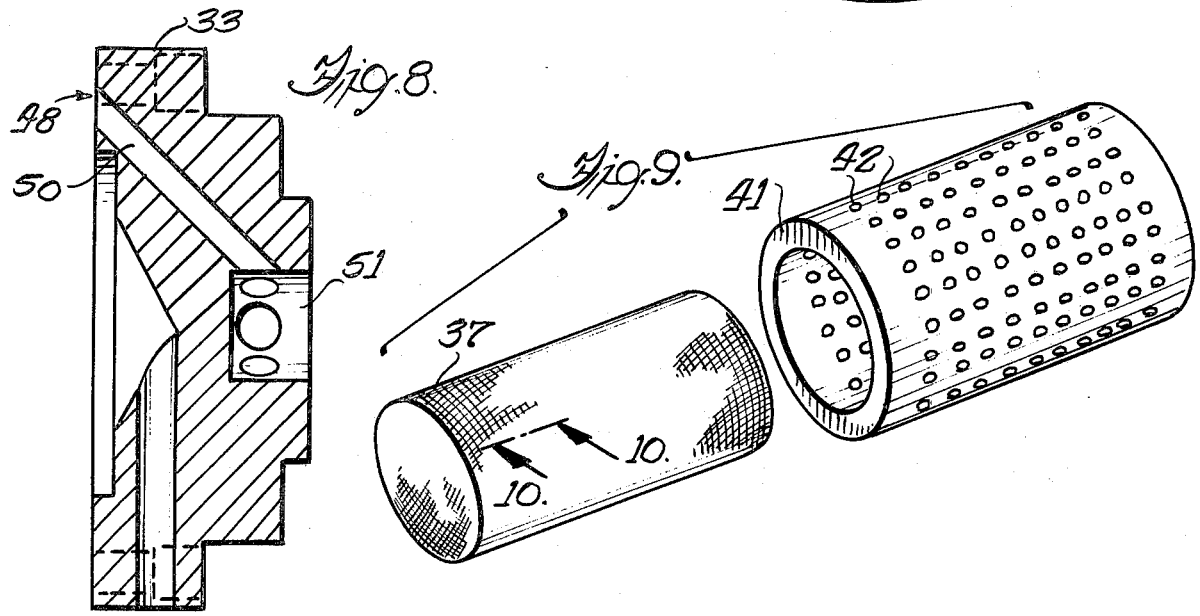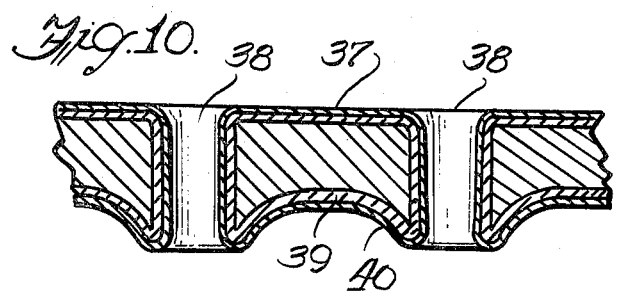

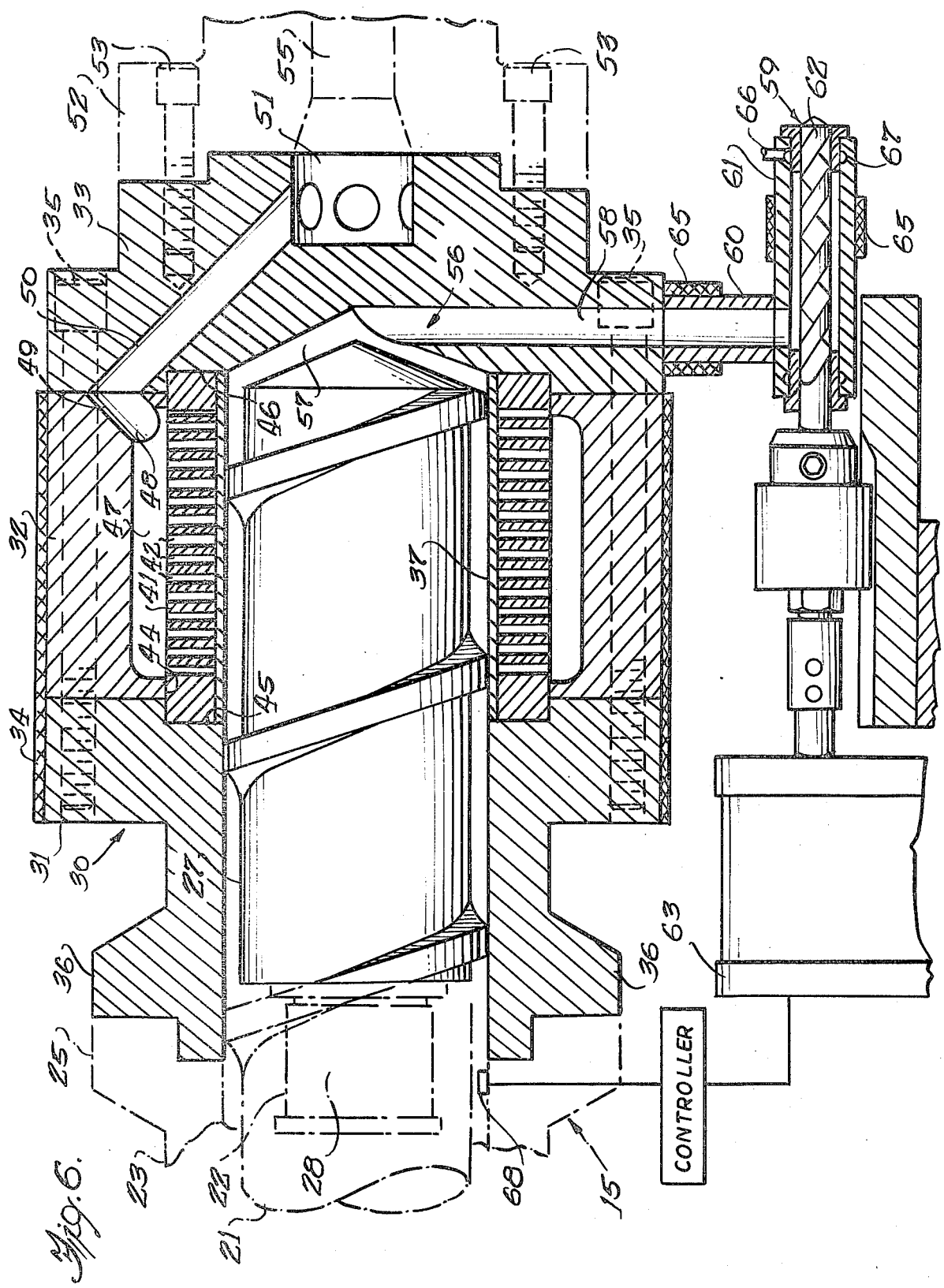

METHOD AND APPARATUS FOR CLEANING THERMOPLASTIC MATERIALS

The present invention relates to a method of, and apparatus for cleaning contaminated thermoplastic material. More particularly, the present invention relates to a method of, and apparatus for cleaning thermoplastic material of minute contaminants or hard materials, such as metal and thermosetting plastic.

There is a need in the industry for a method of and apparatus for cleaning thermoplastic materials to very low levels of contamination on a large commercial scale, especially in connection with reclaiming thermoplastic material from the scrap plastic insulated wire. Such scrap wire may contain copper, nylon fibers, polypropylene, polyethylene, nylon, hard rubbers, wood rods, iron and polyvinylchloride. In a pending patent application Ser. No. 694,096, filed June 9, 1976, which application is assigned to the assignee of the present application, a process and an apparatus are disclosed for reclaiming the polyvinylchloride from the scrap wire. In the disclosed process, the scrap wire is chopped into discrete pieces at a comminuting station; most of the light fines and nylon freed by the comminuting process are removed by an aspirating means; and most of the metallic particles are removed from the chopped pieces by mechanical separation and/or other steps. While the resulting thermoplastic pieces are free of large particles of metal and/or other hard materials, minute particles of such material are still contained therein. While such processes may reduce the level of contaminants levels of 1% or less in the plastic material, the purchasers of such material require that the thermoplastic material be substantially cleaner in order not to plug the screeners on their extruders or to be a source of defects in articles made therefrom.

Usually, the reclaimed thermoplastic is extruded and pelletized before being sold. During this extruding and pelletizing operation, the reclaimed thermoplastic pieces are placed into the extruder, wherein the thermoplastic is rendered molten, and then passed through a filter disposed diametrically across the end of the extruder to remove the larger minute particles. However, in such apparatus the separated material quickly builds up on the filter thereby creating a back pressure which eventually breaks the filter. Typically, the filters are formed of woven wire filaments defining small holes through which the melted plastic passes. The nylon fibers in the reclaimed thermoplastic material tend to catch at the intersection of the wires and to accumulate forming larger and larger contaminants until the wire filaments break. Additionally, the amount of contaminants in the reclaimed scrap in the extruder is simply too high to be processed by conventional screening techniques even where the screening mechanism is capable of rapid changes in almost a continuous operation. For example, for a production of 1000 lbs./hour of clean thermoplastic, about one half of pound of trash will plug a filter. Attempts have been made to eliminate the problem of pressure on the filter by changing the filter but it has been found that the filters needed to be changed very often to obtain a sufficient volume of product flowing through the filter to make the method economical. The filters needed to be changed approximately every ½ minute for any acceptable volume of flow. However, this is uneconomical because of the costs of filters. Also, changing filters causes spikes of pressure which can cause interruption of subsequent processes.

In addition to the usual very clean thermoplastic material, a fraction of the plastic material separated mechanically is often rich in vinyl or other plastics which could also be reclaimed. However, such fractions are too contaminated or dirty to be cleaned by conventional screening techniques in an extruder as the rate of trash accumulated on the screens will be at least an order of magnitude higher than the level of trash in the cleaner fraction above described.

It has been found that the conventional screening systems in use with extruders are limited in several respects. First, they are limited in effective filtering area to about the diameter of the extruder screw. Secondly, the screens are not self-cleaning and tend to become quickly clogged with contaminants when used with thermoplastics having a high trash content. Thirdly, the screens are typically formed of woven wire filaments and tend to catch fibers at the intersections of the filaments. Further, the woven strand filters tend to have a very limited strength with strands breaking as the pressure builds up in the extruder.

An object of the present invention is the provision of an improved method of, and apparatus for reclaiming thermoplastic material from scrap containing, in addition to the thermoplastic material, metallic pieces and other materials having higher melting points than the thermoplastic material. Another object of the invention is the provision of a method of, and apparatus for economically cleaning thermoplastic material of minute contaminants. As will be explained herein, another aspect of the invention is to overcome the shortcomings of conventional extruder screening systems. Other objects and advantages of the present invention will become apparent by reference to the following description and accompanying drawings wherein:

FIG. 1 is a block diagram showing a method of reclaiming thermoplastic material from scrap wire in accordance with the present invention;

FIG. 2 is a front view of a cleaning apparatus used in the method shown in FIG. 1, which apparatus is mounted by its inlet and to the outlet end of a conventional extruder and by its outlet end to the inlet end of a conventional pelletizer;

FIG. 3 is a reduced end view looking generally in the direction of line 3—3 of FIG. 2;

FIG. 4 is a reduced cross-sectional view taken generally along line 4—4 of FIG. 2;

FIG. 5 is a vertical cross-sectional view taken generally along line 5—5 of FIG. 2;

FIG. 6 is an enlarged cross-sectional view taken generally along line 6—6 of FIG. 3;

FIG. 7 is a vertical cross-sectional view of the center part of the housing of the cleaning apparatus shown in FIGS. 2 to 6;

FIG. 8 is a vertical cross-sectional view of right hand part of the housing of the cleaning apparatus shown in FIGS. 2 to 6;

FIG. 9 is an exploded perspective view of the filter and strainer shown in FIG. 6; and FIG. 10 is an enlarged cross-sectional view taken generally along line 10—10 of FIG. 9.

Generally, in accordance with the present invention, a method is provided for reclaiming thermoplastic material from scrap material including in addition to the thermoplastic material, material having a higher melting point than the thermoplastic material, such as metal, thermosetting materials, etc. The scrap material, which has been treated to remove large particles of metal and/or other hard materials, is heated and extruded to thereby provide a confined pressurized stream of melted thermoplastic material containing therein small metallic and other unmolten particles. A portion of the stream of melted material is filtered to provide a filtrate composed of melted thermoplastic material containing therein unmelted materials having a size less than a preselected size. The separated unmelted material remains in the stream and the flow rate of this remainder portion of the stream is controlled or metered so as to maintain the stream under pressure where it is being filtered whereby most of the melted thermoplastic is caused to flow in the filtrate while the remainder portion carries away the separated unmelted material.

More particularly, the scrap material employed in the method of the present invention preferably contains a high percentage of thermoplastic material and may be obtained by treating scrap telephone communication cable or cordage. Such cordage has an outer jacket of polyvinylchloride or vinyl and an inner core comprising several very fine copper ribbons, each separately wrapped about an inner nylon thread and insulated with a polyethylene jacket. The cordage may be treated as described in the aforementioned patent application Ser. No. 694,096 to provide the scrap material to be used with the method of the present invention. In this connection, as shown in FIG. 1, the scrap wire is chopped into discrete pieces by a chopper comminutor 12. The chopped pieces are then fed to a separating and segregating apparatus 13 which separates and segregates the chopped pieces by differential characteristic thereof into one fraction containing primarily pieces of thermoplastic with a small residue of contaminants, such as metallic pieces, polyethylene, and other hard materials, and into a second fraction primarily of pieces of copper wire. The second fraction may then be delivered to conventional apparatus to prepare the copper for subsequent use.

As shown in FIG. 1, the fraction containing primarily pieces of thermoplastic with the small residue of metal and other pieces of hard materials are fed to a conventional heater and extruder 15 which heats the scrap material to a temperature such that the thermoplastic material is melted but the hard material remains unmelted. To reclaim only polyvinylchloride, the temperature is selected to be above the melting point of polyvinylchloride but below the melting point of other thermoplastic materials having higher melting points, such as polyethylene or polypropylene. The heated and extruded thermoplastic material is fed to the cleaning apparatus 16 that is shown in FIGS. 2 to 9 and is described more fully hereinafter. The cleaning apparatus 16 filters a portion of the heated and extruded thermoplastic material with the hard material disposed therein to provide a filtrate composed of melted thermoplastic containing unmelted contaminants of a size less than a preselected size. The remaining portion of the extruded material contains unmelted materials having a size greater than the preselected size. The flow rate of the remaining portion is controlled or metered by a flow control 17 so that most of the melted thermoplastic material is caused to flow into the filtrate. The filtrate is then extruded into spaghetti which is fed to a conventional pelletizer 18 and the resulting pellets may be used in a conventional process for making plastic articles.. The remaining portion is chilled and ground in the flow control 17 to provide a resulting material from which the copper may be recovered.

The cleaning apparatus for use in the method of the invention is shown in FIGS. 2 through 10 of the drawings. As particularly shown in FIGS. 2 and 6, the cleaning apparatus is designed to be attached to the output end of an extruder 15 which has sufficient excess power to drive the cleaning apparatus. The extruder may be a 4½ inch diameter extruder made by Sterling Extruder Corporation. Such an extruder includes an extruder screw 21 the output end of which is provided with a threaded recess 22 that normally receives a detachable screw nose (not shown). A barrel 23 encircles the screw 21 and is provided at its output end with a flange 25 to which a die adapter (not shown) is normally mounted by a die adapter clamp 26.

The illustrated cleaning apparatus includes a screw extension 27 which is attached to the downstream end of the extruder screw 21 by screwing a threaded projection 28 on the upstream end of the screw extension 27 into the threaded recess 22. The screw extension 27 receives the melted thermoplastic material from the extruder 20 and pushes it through the cleaning apparatus under pressure. For best operation, the screw extension 27 is of the same diameter and has the same screw pitch as the extruder screw 21.

As shown in FIG. 6, the screw extension 27 is enclosed by a housing 30 which includes a two part cylindrical barrel extension 31 and 32 encircling the screw extension and an end part 33, enclosing the end of the screw extension. The housing parts are retained in as assembled condition by suitable means such as bolts 35. The upstream barrel extension part 31 serves as an adapter for mounting the housing 30 to the downstream end of the barrel 20 of the extruder 20. In this connection, the upstream barrel extension part is reduced in diameter at its upstream end and this reduced diameter portion is provided with a flange 36 which corresponds to the flange 25 on the extruder and is retained in abutting relation thereto by the die adapter clamp 26 (FIG. 2).

Melted thermoplastic material received from the extruder 15 is maintained in a melted condition by heating the barrel extension by means of band heaters 34 encircling the barrel extension 31, 32. Melted thermoplastic material in the barrel extension is forced by the screw extension through a tubular filter or screen 37 which removes the contaminants from the flow larger than a preselected size. More particularly, the filter 37 has an internal diameter approximately the same as the internal diameter of the barrel 23 of the extruder 15 and is disposed coaxially about the end of the screw extension 27. The filter 37 is provided with a plurality of holes 38 (FIGS. 9 and 10), the diameters of which are selected to provide the desired end product. In this connection, the ultimate user of the thermoplastic material, molders and extruders, normally employ 40, 60 or 120 meshed filters to remove pieces of trash which may plug their sprues or molding machines or which may appear on the outside of the molded piece. As long as the contaminants in the thermoplastic material pass through such filters, the thermoplastic material is considered to be "clean". It has been found that such clean thermoplastic material may be obtained by employing a filter in the cleaning apparatus having holes about 0.005 to 0.010 inch in diameter. An acceptable flow rate may be obtained by providing about 3900 of such holes per square inch.

Preferably, the filter 37 should have sufficient mechanical strength so as not to break or blow out under the pressures existing in the cleaning apparatus and also should not clog up with fibers, for example nylon threads, contained within the scrap material. Perforated plates have greater strength than woven filters but it has been found that if a standard perforated sheet were employed for the filter there would be a fiber buildup in the holes of the filter caused by filters hanging up on the hole edges. This buildup of fibers causes an increased back pressure which breaks the filter 37. To increase the strength of the filter 37 and to reduce the hang up of fibers on the edges of the hole 38, the perforated plate is plated with a high strength material, preferably abrasive resistant. The plating increases the thickness of the filter thereby increasing the blowout strength of the filter 37 and as shown in FIG. 10 also rounds the sharp edges of the hole 38. In one application, a 28 gauge brass sheet which is perforated with 0.010 inch diameter holes, 3906 holes per square inch, is first plated with a 0.002 inch nickel layer 39 and then with a 0.0002 inch chromium layer 40. Such a filter has a blowout strength of about 9500 psi which is sufficient for most extruders which operate in the range of 2000 to 2400 psi.

As shown in FIG. 6, the filter 37 is supported by a tubular strainer or breaker plate 41 of a suitable structural material such as mild steel. The central portion of the strainer 41 is provided with a plurality of radially extending holes 42. In one embodiment, 280 holes, 5/64th inches in the diameter are provided in 28 axially extending rows, 10 holes to a row spaced on 0.109 inch centers.

The strainer 42 and the filter 37 screen are disposed within an annular recess 44 in the housing 30 defined by an annular notch 45 in the downstream face of the upstream part 51 of the housing, an increased inner diameter of the center part 32 of the housing and an annular notch 46 in the upstream face of the end part 33 of the housing.

The thermoplastic material passing through the filter 37 and the strainer 41 enters an annular orifice 47 provided in the center part 32 of the housing, opposite the central portion of the strainer. The thermoplastic material exits from the orifice 47 through seven radial spaced ports 48. Each of the ports 48 includes an outwardly and downstream extending first portion 49 at the downstream end of the center part 32 of the housing and a second portion 50 extending downstream and inwardly through the end part 33 of the housing. The downstream ends of the ports 48 terminate in a central cylindrical recess or outlet port 51 in the downstream face of the end part 33 of the housing.

In the illustrated embodiment, the end part 33 of the housing serves as an adapter whereby a conventional pelletizer die adapter 52 may be connected to the cleaning apparatus by suitable means. In this connection, the downstream end of the end part 33 of the housing is shaped to receive the pelletizer die adapter 52 which is secured thereto by bolts 53. Thus, the thermoplastic flowing through the outlet port 51 of the cleaning apparatus passes into the in feed hole 55 of the pelletizer die adapter 52.

The material which is filtered or separated from the thermoplastic material by the filter 37 is continuously moved along the inner surface of the filter 37 by the rotating screw extension 27. This movement cleans the contaminants or trash from the inner surface of the filter 37 thereby preventing a buildup of contaminants on the filter 37 and hence prevents a buildup of back pressure which would cause breakage of the filter. As shown in FIG. 6, the contaminants exit from the cleaning apparatus through a reject port 56 provided in the housing at the downstream end of the extension screw. In this connection, the upstream face of the end port 33 of the housing 30 is provided with a conical recess 57 which is of such a size as to provide an orifice at the downstream end of the screw extension. A vertically extending hole 58 is provided between the bottom of the end part 33 and the orifice 57.

To insure that most of the thermoplastic material flows through the filter 37 rather than through the reject port 56, means 59 are provided on the reject port 56 to control or meter the flow rate. By controlling or metering the flow rate of the material flowing through the reject port 56, a high pressure is maintained across the filter 37 thereby causing most of the thermoplastic material to flow through the filter. In the illustrated embodiment, the reject flow rate is controlled by increasing the viscosity of the thermoplastic material flowing through the reject port 58 and then discharging this semi solid material at a controlled rate.

More particularly, as shown in FIG. 6, the lower end of the reject port 58 is connected to the upper end of a vertical pipe 60, the lower end of which is connected to the downstream end of a horizontally extending, tubular nozzle 61. Disposed within the nozzle 61 is an auger or drill bit 62 which is driven by a suitable motor 63. The interior of the exit end of the nozzle 61 is reduced in diameter so as to be slightly larger than the drill bit 62 whereby the material exists from the nozzle substantially only in the grooves of the drill bit. The drill bit should be large enough to prevent the large pieces of trash from breaking the bit but small enough to restrict the flow of trash. In one application, a ½ inch twist drill provided satisfactory results. The trash flowing through the pipe 60 and through most of the nozzle 61 is maintained in a melted condition by strip heaters 65 encircling the pipe and nozzle. However, at the exit end of the nozzle the trash is cooled to increase its viscosity so that it is semi-rigid by a cooling means 66 such as water flowing through an annular port 67 in the exit end. The other end of the nozzle 61 is also reduced in diameter and cooled to prevent trash from flowing through that end of the nozzle. The trash passing out of the exit end of the nozzle 61 is granulated by the drill bit 62 thereby rendering any copper in the trash free, thus permitting it to be more easily reclaimed.

In the illustrated embodiment, the speed of the motor 63 is controlled to maintain the pressure across the filter 37 relatively constant. The pressure in the barrel is sensed by a pressure transducer 68 disposed in the barrel 23 of the extruder 75 up stream of the filter 37. The pressure transducer 68 is connected to a conventional motor controller 69 for the variable speed motor 63 and is connected so that a higher pressure speeds up the motor.

The above described manner of cooling the thermoplastic to a semi-solid state and then griding the same has been found to be a superior manner of operation. If the material is not cooled to the semi-solid state, too large a portion of the vinyl flows through the nozzle. Attempts have been made to use valves to control the flow from the nozzle 61 but the trash often contains particles too large to pass through the valve and this plugs the valve. If the valve orifice is made larger, then more vinyl is lost through the nozzle 61. The grinding of the large pieces by the drill bit 62 removes any large particles and the drill bit is turned in a direction to ensure carrying of the ground material through the nozzle. If the thermoplastic material is frozen to a solid state, it tends to plug the pipes. Furthermore, the grinding of the trash stream tends to mechanically separate the vinyl and copper to enhance further segregation thereof from each other.

The above-described method and apparatus provides a clean thermoplastic material, that is, it provides a thermoplastic material in which the contamination level is such that the contaminants pass through the filter of the user. The filter in the cleaning apparatus is self-cleaning which allows a substantially continuous process with only periodic shut-down. Also, because the filter extends along the extruder rather than across the extruder, a larger area of filter can be used. The method permits separation of thermosetting or high melting point thermoplastic from polyvinylchloride. Also, the apparatus permits a minimum retrofit of conventional extruder equipment.

Various changes and modifications may be made in the above-described method and apparatus without deviating from the spirit or scope of the present invention. Various features of the invention are set forth in the accompanying claims.

I claim:

1. A method of cleaning contaminated thermoplastic material comprising the steps of heating thermoplastic material containing small pieces of contaminants to a temperature such that the thermoplastic material is melted but contaminants are not melted, extruding the heated material to provide a confined stream of material under pressure, filtering a portion of said stream to provide a filtrate composed of melted thermoplastic material containing ummelted contaminants having a size smaller than a preselected size and controlling the flow rate of the remainder portion of said stream to maintain said stream under pressure where it is being filtered whereby most of said stream is caused to flow in said filtrate and said remainder of said stream carries away contaminants separated by said filtering step, said controlling of flow rate step including chilling the remainder portion to reduce the speed of its flow and removing the chilled material at a controlled rate.

2. A method in accordance with claim 1 wherein the chilled material is ground while it is being removed.

3. A method of cleaning contaminated thermoplastic material comprising the steps of heating thermoplastic material containing small pieces of contaminants to a temperature such that the thermoplastic material is melted but contaminants are not melted, extruding the heated material to provide a confined stream of material under pressure, filtering a portion of said stream to provide a filtrate composed of melted thermoplastic material containing unmelted contaminants having a size smaller than a preselected size and controlling the flow rate of the remainder portion of said stream to maintain said stream under pressure where it is being filtered whereby most of said stream is caused to flow in said filtrate and said remainder of said stream carries away contaminants separated by said filtering step, said filtering step causing the portion of said stream to flow at an angle to the direction of said stream, said controlling of flow rate step including chilling the remainder portion to reduce the speed of its flow and removing the chilled material at a controlled rate.

4. A method for reclaiming thermoplastic material from scrap wire comprising the steps of: chopping the scrap wire into discrete chopped pieces, separating and segregating the chopped wire pieces by differential characteristics thereof into one fraction containing primarily pieces of thermoplastic with a small residue of metallic pieces and other hard materials therein and into a second fraction primarily of pieces of wire, heating the first fraction to melt the thermoplastic material but not the other hard material, extruding the melted material to provide a stream of material under pressure, filtering a portion of said stream of heated and extruded material to separate the unmelted hard materials from said portion thereby providing a filtrate composed of thermoplastic material and hard materials having a size smaller than a preselected size, and controlling the flow rate of the remainder portion of the stream to maintain the pressure on the stream during the filtering step whereby most of said stream is caused to flow in said filtrate and said remainder of said stream carries away contaminants separated by said filtering step, said controlling of flow rate step including chilling the remainder portion to reduce the speed of its flow and removing the chilled material at a controlled rate.

5. A method in accordance with claim 4 wherein the chilled material is ground while it is being removed.

6. A method of cleaning small size hard solid contaminants from a thermoplastic material in an extruding device having a rotating extruder screw means and a filter screen, said method comprising the steps of: charging the extruding device with thermoplastic material having the contaminants therein, heating the thermoplastic within the extruder to a temperature to keep the thermoplastic material melted with the contaminants unmelted, continuously turning the extruder screw means and forcing the melted thermoplastic material through said screen, maintaining a pressurized and continuously discharging stream of filtered thermoplastic material from said screen representing a very substantial portion of the thermoplastic material being put into said device, continuously carrying contaminants from said screen having a size larger than the particle size passed by said screen by a small remainder stream of thermoplastic material and contaminants, and controlling the flow of said remainder stream through an outlet with a cross section to pass the larger sizes of hard solid contaminants while maintaining a predetermined pressure at the screen to cause a very substantial flow rate through the screen by passing the remainder stream through a screw and rotating said screw separately from said extruder to limit the flow rate of the remainder and to maintain said pressure.

7. A method of filtering thermoplastic material in accordance with claim 6 wherein the filtering step causes the portion of said stream to flow at an angle to the direction of said stream.

8. A method in accordance with claim 6 in which said thermoplastic material is scrap wire insulation and in which said contaminants comprises pieces of metal and other non-thermoplastic material, said method further comprising the step of maintaining a relatively constant pressure and a substantially continuously flowing remainder stream and including the step of chilling the remainder stream.

9. A method in accordance with claim 6 including the step of forming spaghetti-like strands of filtered thermoplastic material and pelletizing the strands to form pellets.

10. A method in accordance with claim 6 in which said step of controlling the flow of the remainder stream comprises the step of metering the flow rate of the remainder stream having the contaminants therein to maintain a substantially constant pressure across said filter screen to provide an uninterrupted stream of filtered thermoplastic to a pelletizing means, and pelletizing the stream of filtered material to provide thermoplastic pellets.

11. A method in accordance with claim 6 in which said method comprises the steps of reducing the pressure of the remainder stream gradually from high pressure to low pressure at a controlled rate.

* * * * *